(12) United States Patent
Lee et al.

(10) Patent No.: US 12,440,122 B2
(45) Date of Patent: Oct. 14, 2025

(54) MOUTHPIECE ASSEMBLY FOR RESPIRATION MEASUREMENT DEVICE

(71) Applicant: BREATHINGS CO., LTD., Wonju-si (KR)

(72) Inventors: Inpyo Lee, Seoul (KR); Kisang Yoon, Yongin-si (KR); Changho Song, Seongnam-si (KR)

(73) Assignee: BREATHINGS CO., LTD., Wonju-si (KR)

(*) Notice: Subject to any disclaimer, the term of this patent is extended or adjusted under 35 U.S.C. 154(b) by 443 days.

(21) Appl. No.: 17/918,066

(22) PCT Filed: Dec. 15, 2020

(86) PCT No.: PCT/KR2020/018297
§ 371 (c)(1),
(2) Date: Oct. 10, 2022

(87) PCT Pub. No.: WO2022/045480
PCT Pub. Date: Mar. 3, 2022

(65) Prior Publication Data
US 2023/0157576 A1    May 25, 2023

(30) Foreign Application Priority Data

Aug. 31, 2020  (KR) .................. 10-2020-0109829
Dec. 14, 2020  (KR) .................. 10-2020-0174081

(51) Int. Cl.
*A61B 5/097*    (2006.01)
*A61B 5/087*    (2006.01)
*A61B 5/091*    (2006.01)

(52) U.S. Cl.
CPC .............. *A61B 5/097* (2013.01); *A61B 5/087* (2013.01); *A61B 5/091* (2013.01); *A61B 2562/0247* (2013.01)

(58) Field of Classification Search
CPC .......... A61B 5/08; A61B 5/082; A61B 5/083; A61B 5/087; A61B 5/0871; A61B 5/097
USPC .................................... 600/529, 538
See application file for complete search history.

(56) References Cited

U.S. PATENT DOCUMENTS

2021/0212593 A1*  7/2021  Xu ................... A61B 5/097

FOREIGN PATENT DOCUMENTS

| EP | 2117429 B1 | 6/2020 |
|---|---|---|
| JP | 2017-060554 A | 3/2017 |
| KR | 2018-0000336 U | 2/2018 |
| KR | 10-2039982 B1 | 11/2019 |
| WO | 97-20500 A1 | 6/1997 |

* cited by examiner

*Primary Examiner* — Puya Agahi
(74) *Attorney, Agent, or Firm* — NKL LAW; Jae Youn Kim

(57) ABSTRACT

Provided is a mouthpiece assembly for a respiration measurement device, the mouthpiece assembly including a first main body including a respiration measurement module, and a mouthpiece detachably coupled to the first main body, wherein the mouthpiece includes a tube adapter having a cylindrical tube shape, and a first tube having a cylindrical tube shape, the first tube being detachably coupled to the tube adapter. The mouthpiece assembly is economically efficient by reducing manufacturing costs.

6 Claims, 6 Drawing Sheets

MOUTHPIECE ASSEMBLY FOR RESPIRATION MEASUREMENT DEVICE

TECHNICAL FIELD

The present invention relates to a mouthpiece assembly for a respiration measurement device, and more particularly to a hygienic and economical mouthpiece for a respiration measurement device capable of being applied to a device configured to measure respiration of a user.

BACKGROUND ART

In general, a respiration measurement device is a device configured to measure and analyze respiration volume and lung capacity of a user, and is an essential tool for lung health management. The respiration measurement device may include a respiration tube, that is, a mouthpiece placed in the mouth of a user and configured to allow the user to breathe in and out therethrough in order to analyze respiration volume of the user.

This mouthpiece should be harmless to the human body because the same is a component which directly touches a user's mouth, and is mainly manufactured by injection-molding a medical plastic material, thereby making it possible to maintain the shape thereof when used and to secure durability thereof.

Meanwhile, this mouthpiece is required to consider health and hygiene because a user directly touches the same and blows his or her breath therein to. Therefore, this mouthpiece is used as a disposable component and is discarded after the user uses the mouthpiece.

However, since such a mouthpiece of the related art is made of a medical plastic material requiring high manufacturing costs, there is a problem in that the burden of manufacturing costs is inevitably increased and economic feasibility deteriorates accordingly.

DISCLOSURE

Technical Problem

Therefore, the present invention has been made in view of the above problems, and it is an object of the present invention to provide a mouthpiece assembly for a respiration measurement device capable of maintaining hygiene thereof and reducing economic burden by using a material that is not only harmless to the human body, but also economical and easy to manufacture.

Technical Solution

In accordance with the present invention, the above and other objects can be accomplished by the provision of a mouthpiece assembly for a respiration measurement device, the mouthpiece assembly including a first main body including a respiration measurement module, and a mouthpiece detachably coupled to the first main body, wherein the mouthpiece includes a tube adapter having a cylindrical tube shape, wherein the tube adapter has a first seating surface formed on an inner peripheral surface or an outer peripheral surface of one end thereof, and an insertion hole formed to penetrate an outer peripheral side surface thereof, wherein the respiration measurement module is inserted into the insertion hole when the tube adapter is coupled to the first main body, wherein the insertion hole is shielded when the respiration measurement module is inserted into the insertion hole, and a first tube having a cylindrical tube shape, wherein the first tube has one end thereof detachably coupled to the one end of the tube adapter, and one side surface thereof contact-coupled to the first seating surface when coupled to the tube adapter, wherein the respiration measurement module has a first differential pressure generation portion formed to protrude from an inner peripheral surface thereof, wherein the first differential pressure generation portion has a predetermined thickness and height in a circumferential direction of passing through the insertion hole, and wherein the tube adapter has a second differential pressure generation portion formed to protrude from an inner side surface thereof, wherein the second differential pressure generation portion has a predetermined thickness and height corresponding to the first differential pressure generation portion.

Advantageous Effects

A mouthpiece assembly for a respiration measurement device according to the present invention includes a mouthpiece partially formed with a material that is harmless to the human body and economical, thereby making it possible to maintain hygiene thereof and reduce manufacturing costs. Accordingly, economic effects may be achieved through the mouthpiece assembly.

Further, in the mouthpiece assembly for the respiration measurement device according to the present invention, a portion of the mouthpiece coupled to a first main body is made of a durable medical plastic material, and the rest thereof is made of an inexpensive paper material that is harmless to the human body, thereby making it possible not only to reduce manufacturing costs, but also to provide economic effects because manufacturing is easy.

In addition, since the mouthpiece assembly for the respiration measurement device according to the present invention has a simple structure and may be miniaturized, it is possible to easily measure respiration volume of a subject regardless of time and place, as well as at home or in a hospital. The mouthpiece assembly includes the first main body including a respiration measurement module and a mouthpiece having an air flow path formed therein, the air flow path having air flowing there through. Here, the first main body and the mouthpiece are separately formed and configured to be detachable from each other, thereby making it possible to easily remove foreign substances remaining in the sensor of the respiration measurement module and the air flow path. Accordingly, it is possible to provide an effect of easily maintaining a hygienic state of the mouthpiece assembly.

Additionally, the mouthpiece assembly for the respiration measurement device according to the present invention may increase sensing sensitivity through a first differential pressure generation portion and a second differential pressure generation portion. Further, since the mouthpiece assembly has a simple structure, the same may improve performance and provide economic effects.

Further, the mouthpiece assembly for the respiration measurement device according to the present invention includes the first main body including the respiration measurement module configured to measure respiratory airflow and the mouthpiece having an air flow path through which the respiratory airflow moves. Here, since the first main body and the mouthpiece are separately formed and configured to be detachable from each other, the same may be easily replaced after use by a user and efficiently managed in a hygienic manner.

DESCRIPTION OF DRAWINGS

The above and other objects, features and other advantages of the present invention will be more clearly understood from the following detailed description taken in conjunction with the accompanying drawings, in which.

BEST MODE

Figure 1:
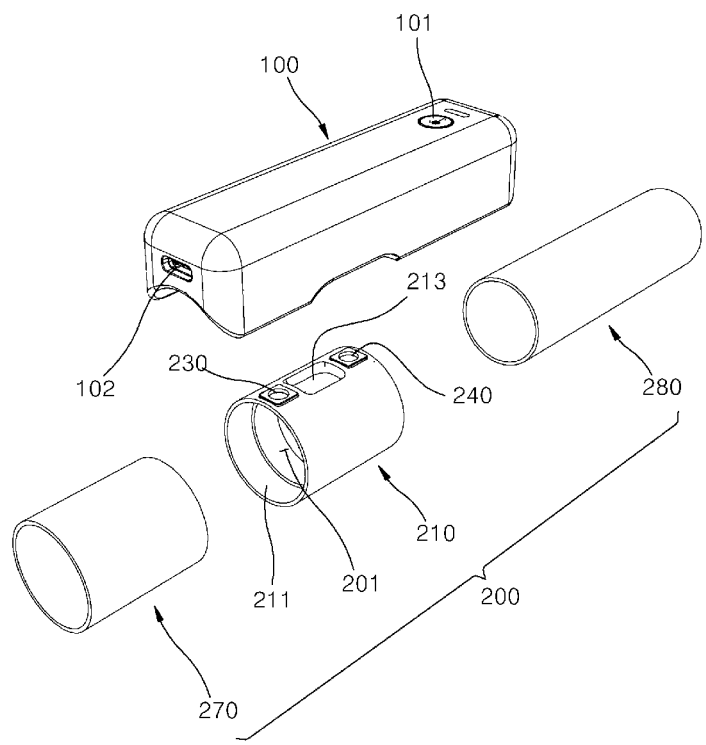
FIG. 1 is an exploded perspective view showing a mouthpiece assembly for a respiration measurement device according to an embodiment of the present invention.

Hereinafter, preferred embodiments of the present invention will be described with reference to the accompanying drawings so as to explain the present invention in more detail.

Since the present invention may have various modifications and embodiments, specific embodiments are illustrated in the drawings and described in detail. However, it is not intended to limit the present invention to the specific embodiments, and it should be understood that the specific embodiments cover all modifications, equivalents, and substitutes within the spirit and technical scope of the present invention.

Terms such as "first", "second", and the like may be used herein to describe various components, but the components should not be limited by the terms. The terms are used only for the purpose of distinguishing one component from another component. For example, a first component may be referred to as a second component and, similarly, a second component may be referred to as a first component without departing from the scope of the present invention. Terms such as "and/or" include a combination of a plurality of related described items or any one of a plurality of related described items.

It will be understood that, when an element is referred to as being "connected" or "joined" to another element, the element may be directly connected or joined to the other element, but it should be understood that any intervening element may also be present there between. In contrast, when an element is referred to as being "directly connected" or "directly joined" to another element, it should be understood that no intervening element is present there between.

The terms used in the present application are used only to describe specific embodiments and are not intended to limit the present invention. Singular forms are intended to include plural forms as well, unless the context clearly indicates otherwise. It will be further understood that the terms "comprises", "includes", and/or "has", when used in the present application, specify the presence of stated features, integers, steps, operations, elements, components, or combinations thereof, but do not preclude the presence or addition of one or more other features, integers, steps, operations, elements, components, or combinations thereof.

Unless defined otherwise, all terms used herein, including technical or scientific terms, have the same meaning as those generally understood by those skilled in the art to which the present invention pertains. Terms such as those defined in commonly used dictionaries should be interpreted as having meanings consistent with those in the context of the related art. Unless explicitly defined in the present application, the terms are not interpreted in an ideal or overly formal sense. In addition, in order to facilitate the overall understanding in describing the present invention, the same components in the drawings are denoted by the same reference numerals, and duplicate descriptions of the same components are omitted.

Hereinafter, preferred embodiments of the present invention will be described in more detail with reference to the accompanying drawings.

Referring to FIG. 1, a mouthpiece assembly for a respiration measurement device according to an embodiment of the present invention may be formed of a first main body 100 and a mouthpiece 200 detachably coupled to the first main body 100, the mouthpiece 200 having an air flow path 201 formed therein.

First, the first main body 100 may include a respiration measurement module 110. The respiration measurement module 110 is configured to measure the pressure of air, and when the first main body 100 and the mouthpiece 200 are coupled to each other, the pressure of air passing through the air flow path 201 may be measured.

The first main body 100 may be formed of an operation switch 101 configured to enable a user to control ON/OFF or the like and a connector portion 102 to be connected to an external device (not shown) so that information measured by the respiration measurement module 110 may be analyzed by the external device or stored therein. Here, the connector portion 102 is formed as a connector groove portion as shown in the drawing, and may be applied to various configurations such as a configuration in which a connector pin is detachable from the connector portion 102 or a configuration in which a connecting wire is fixedly coupled thereto.

Figure 2:
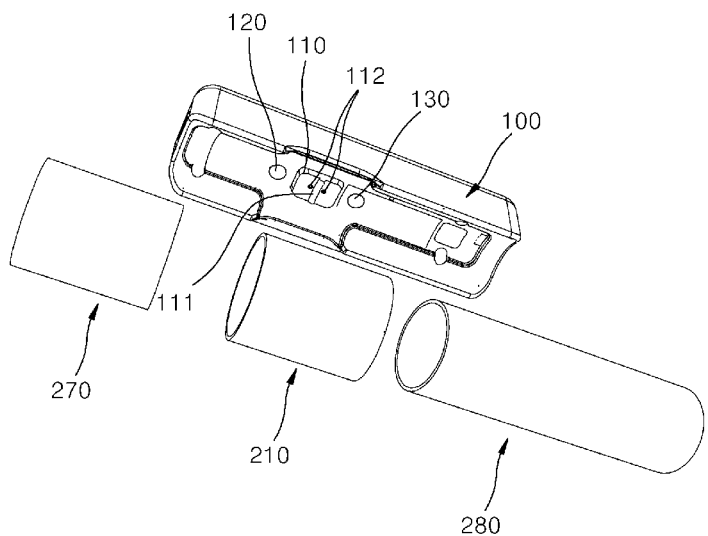
FIG. 2 is an exploded perspective view showing a bottom portion of a first main body in the mouthpiece assembly for the respiration measurement device in FIG. 1.

Referring to FIG. 2, the respiration measurement module 110 may be configured to sense differential pressure by causing the differential pressure to be generated, and to measure respiration volume or the like based on the sensed differential pressure.

To this end, the respiration measurement module 110 may have a first differential pressure generation portion 111 formed to protrude from the side surface thereof facing the air flow path 201, the first differential pressure generation portion 111 having a predetermined thickness and height.

Here, the first differential pressure generation portion 111 is formed to protrude by the predetermined height in the air flow path 201, thereby obstructing the flow of air through the air flow path 201 and generating differential pressure.

The respiration measurement module 110 may have a sensing flow path 112 formed therein to sense the differential pressure generated by the first differential pressure generation portion 111, and a sensing unit (not shown) may be provided on the sensing flow path 112.

The sensing flow path 112 has an inlet and an outlet formed on opposite sides of the first differential pressure generation portion 111 in the forward-and-backward direction with the first differential pressure generation portion 111 interposed there between, and the sensing unit may be configured to sense a pressure difference at each of the inlet and the outlet.

Meanwhile, although not shown, in order to sense the differential pressure, the respiration measurement module 110 may include an atmospheric pressure sensor or a pressure sensor configured to sense a pressure difference between opposite sides of the first differential pressure generation portion 111 instead of the sensing flow path 112 and the sensing unit.

The first main body 100 may include a first coupling portion 120 and a second coupling portion 130 detachably coupled to a tube adapter 210, and the first coupling portion 120 and the second coupling portion 130 will be described in more detail in a third coupling portion 230 and a fourth coupling portion 240 to be described later.

The first main body 100 may have a circuit board (not shown) embedded therein and configured to perform operation of the respiration measurement module 110.

The mouthpiece 200 may be formed of the tube adapter 210, a first tube 270, and a second tube 280.

The tube adapter 210 has a cylindrical tube shape, and the outer peripheral side surface thereof is detachably coupled to the first main body 100. Here, the tube adapter 210 may have an insertion hole 213 formed on the outer peripheral side surface thereof, the insertion hole 213 having the respiration measurement module 110 inserted there into when the tube adapter 210 is coupled to the first main body 100. In this case, the tube adapter 210 may be configured to seal the insertion hole 213 when the respiration measurement module 110 is inserted into the insertion hole 213.

Meanwhile, the insertion hole 213 may be formed in the central portion of the tube adapter 210 in the longitudinal direction, as shown in the drawing, but this is an embodiment and the formation position of the insertion hole 213 may be variously changed.

The first tube 270 may be detachably coupled to one side of the tube adapter 210 and the second tube 280 may be detachably coupled to the other side thereof.

Figure 3:
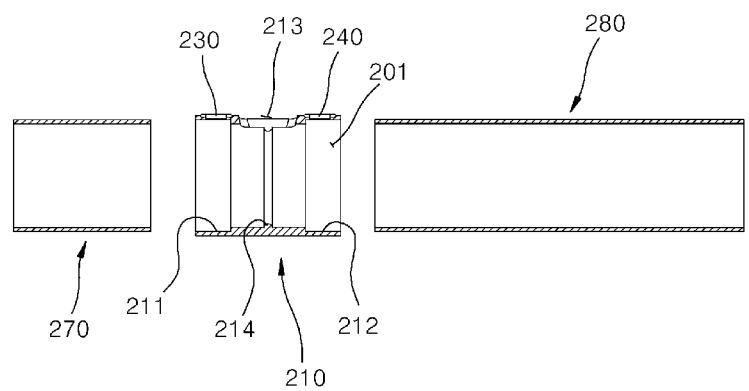
FIG. 3 is a front cross-sectional view showing the inside of the mouthpiece assembly for the respiration measurement device in FIG. 1.

Referring to FIG. 3, the tube adapter 210 may have a first seating surface 211 formed on one inner peripheral surface thereof, wherein the first tube 270 is contact-coupled to the first seating surface 211, and a second seating surface 212 formed on the other inner peripheral surface thereof, wherein the second tube 280 is contact-coupled to the second seating surface 212.

When the first tube 270 and the second tube 280 are coupled to the opposite sides of the tube adapter 210, the first seating surface 211 and the second seating surface 212 prevent external air or internal air from flowing into or out of the air flow path 201 inside the mouthpiece 200, and cause the first tube 270 and the second tube 280 to closely contact the tube adapter 210, thereby achieving more close coupling there between.

The first seating surface 211 and the second seating surface 212 are formed in the circumferential direction of the inner peripheral surface from an end to a predetermined length, as shown in the drawing, and may be formed in the form of a groove having a predetermined depth from the inner peripheral surface.

Furthermore, the first seating surface 211 is preferably formed to have the same depth (height) as a thickness of the first tube 270 contact-coupled thereto, and the second seating surface 212 is preferably formed to have the same depth (height) as a thickness of the second tube 280 contact-coupled thereto.

Accordingly, when the first tube 270 and the second tube 280 are coupled to the first and second seating surfaces 211 and 212 formed on the opposite sides of the tube adapter 210, it is possible to prevent generation of unnecessary differential pressure by preventing a step difference from being formed therein.

Meanwhile, in the drawing, the tube adapter 210 has the first seating surface 211 formed on one inner peripheral surface thereof and the second seating surface 212 formed on the other inner peripheral surface thereof so that the first tube 270 and the second tube 280 are configured to be respectively inserted into the inner peripheral surfaces of opposite ends of the tube adapter 210.

However, in this embodiment, the first seating surface 211 and the second seating surface 212 may be respectively formed on opposite outer peripheral side surfaces of the tube adapter 210, and the opposite end portions of the tube adapter 210 may be respectively inserted into and coupled to the inner peripheral surfaces of the first tube 270 and the second tube 280.

The tube adapter 210 may have a second differential pressure generation portion 214 formed to protrude from the inner side surface thereof, the second differential pressure generation portion 214 having a predetermined thickness and height corresponding to the first differential pressure generation portion 111.

The second differential pressure generation portion 214 is formed to protrude by the predetermined height in the air flow path 201 in the same manner as the first differential pressure generation portion 111, thereby obstructing the flow of air through the air flow path 201 and forming differential pressure.

The second differential pressure generation portion 214 may be formed on the inner peripheral surface of the tube adapter 210 in the circumferential direction.

In this case, when the first main body 100 and the tube adapter 210 are coupled to each other, the first differential pressure generation portion 111 and the second differential pressure generation portion 214 may be aligned with each other in a line to form an annular orifice on the inner peripheral surface in the tube adapter 210 in the circumferential direction.

That is, the first differential pressure generation portion 111 and the second differential pressure generation portion 214 generate differential pressure in the air flow path 201 by forming an annular orifice in the air flow path 201. Accordingly, the respiration measurement module 110 may measure the flow rate of air passing through the air flow path 201 and measure respiration volume of a user. Here, the principle of measuring the respiration volume from the differential pressure generated by such an orifice will be described in more detail with reference to FIG. 7 to be described later.

The tube adapter 210 may include the third coupling portion 230 and the fourth coupling portion 240. The third coupling portion 230 and the fourth coupling portion 240 a repositioned to correspond to the first coupling portion 120 and the second coupling portion 130, respectively. Accordingly, when the tube adapter 210 and the first main body 100 are coupled to each other, the third coupling portion 230 and the fourth coupling portion 240 may be detachably coupled to the first coupling portion 120 and the second coupling portion 130, respectively. In this case, the third coupling portion 230 and the fourth coupling portion 240 may be respectively formed on one front side of the insertion hole 213 and the other rear side thereof in the longitudinal direction of the tube adapter 210, but are not limited thereto.

Each of the first coupling portion 120, the second coupling portion 130, the third coupling portion 230, and the fourth coupling portion 240 may be formed of a magnet having magnetic force, thereby being attached to or detached from each other. However, this configuration is a preferred embodiment, and various configurations may be applied thereto other than the magnet as long as the respective coupling portions are attachable and detachable to and from each other.

Accordingly, the tube adapter 210 and the first main body 100 may be easily coupled to each other through the first coupling portion 120, the second coupling portion 130, the third coupling portion 230, and the fourth the coupling part 240, and may be easily separated from each other when a user applies external force thereto.

Meanwhile, the tube adapter 210 may be formed of a medical plastic material having durability to maintain the shape thereof when the same is coupled to the first main body 100.

The first tube 270 may have a cylindrical tube shape, and one end thereof may be detachably coupled to one side of the tube adapter 210. When the first tube 270 is coupled to the tube adapter 210, one side surface of the first tube 270 may be contact-coupled to the first seating surface 211.

The second tube 280 may have a cylindrical tube shape, and one side thereof may be detachably coupled to the other end of the tube adapter 210. When the second tube 280 is coupled to the tube adapter 210, one side surface of the second tube 280 may be contact-coupled to the second seating surface 212.

Meanwhile, a user may directly put his or her mouth on the first tube 270 or the second tube 280 and breath there through. Here, the first tube 270 or the second tube 280 is used as a disposable component in consideration of hygiene. In consideration of the configurations of the first tube 270 and the second tube 280, the first tube 270 and the second tube 280 may be formed of a pulp (paper) material that is easy to manufacture and harmless to the human body.

According to the above description, the mouthpiece 200 is formed in such a manner that the tube adapter 210 detachably coupled to the respiration measurement module 110 and the first tube 270 or the second tube 280 configured to allow a user to put his or her mouth thereon may be separated from each other to be detachable from each other, thereby making it possible to easily separate each component and clean the same. Further, the tube adapter 210 is formed of a plastic material, and each of the first tube 270 and the second tube 280 is formed fan inexpensive paper material in a different manner from the tube adapter 210, thereby making it possible to reduce manufacturing costs and improve economic efficiency.

Figure 4:
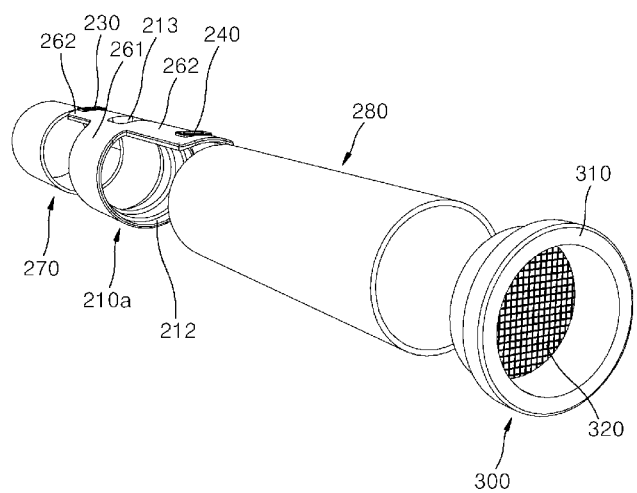
FIG. 4 is an exploded perspective view showing another embodiment of a mouthpiece in the mouthpiece assembly for the respiration measurement device in FIG. 1.
Figure 5:
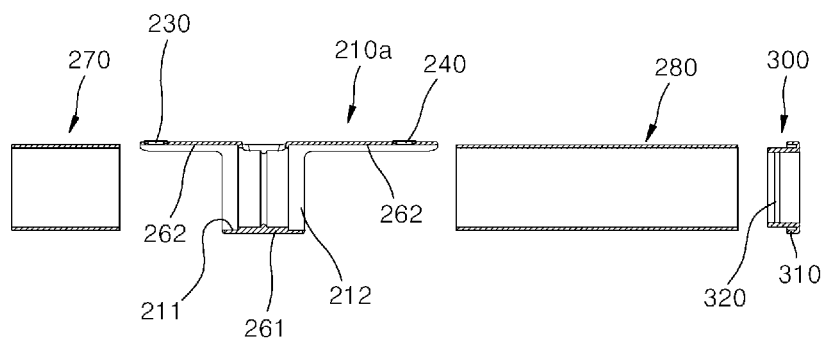
FIG. 5 is a front cross-sectional view showing the inside of the mouthpiece in FIG. 4.

FIGS. 4 and 5 are views showing another embodiment of the mouthpiece 200.

First, referring to FIG. 4, a tube adapter 210a may include a tube adapter body 261 and an extension portion 262.

The tube adapter body 261 has a cylindrical tube shape, and the outer peripheral side surface thereof is detachably coupled to the first main body 100. Here, the outer peripheral side surface may have an insertion hole 213 formed to be penetrated there through, the insertion hole 213 having the respiration measurement module 110 inserted there into, when coupled to the first main body 100.

In addition, the tube adapter body 261 has opposite ends to which the first tube 270 and the second tube 280 are detachably coupled, respectively. More specifically, the tube adapter body 261 may have the first seating surface 211 formed on the inner peripheral surface of one end thereof and contact-coupled to the first tube 270, and a second seating surface 212 formed on the inner peripheral surface of the other end thereof and contact-coupled to the second tube 280. Here, since the configuration of the tube adapter body 261 including the insertion hole 213, the first seating surface 211, and the second seating surface 212 corresponds to the configuration of the tube adapter 210a described with reference to FIG. 1, a detailed description thereof will be omitted.

The extension portion 262 may be formed to extend by a predetermined length in the longitudinal direction (axial direction) from one end side surface (thickness surface) of the tube adapter body 261 and the other end side surface (thickness surface) thereof.

Referring to FIG. 5, when the first tube 270 and the second tube 280 are coupled to the tube adapter 210a, each inner bottom surface of the extension portion 262 may contact a corresponding one of a part of the outer peripheral side surface of the first tube 270 and a part of the outer peripheral side surface of the second tube 280.

The extension portion 262 may guide the first tube 270 and the second tube 280 to be inserted into the tube adapter body 261, and may more stably support the first tube 270 and the second tube 280 after being coupled thereto.

The extension portion 262 may include the third coupling portion 230 and the fourth coupling portion 240, as shown in the drawing. Since the third coupling portion 230 and the fourth coupling portion 240 have been described above, a detailed description thereof will be omitted.

According to the above description, the tube adapter 210a in FIGS. 4 and 5 is formed to include the tube adapter body 261 and the extension portion 262, and the length of the tube adapter body 261 may be reduced compared to the length of the tube adapter 210 in FIG. 1, thereby conserving materials. Further, although the length of the first seating surface 211 and the length of the second seating surface 212 are reduced, the first tube 270 and the second tube 280 may be stably inserted into the tube adapter 210a and supported by the same through the extension portion 262.

Next, the mouthpiece 200 may further include a filter unit 300 configured to filter foreign substances that may be introduced or discharged from and to the outside according to respiration of a user.

The filter unit 300 may be coupled to at least one of the tube adapters 210 and 210a, the first tube 270, or the second tube 280.

FIGS. 4 and 5 show an embodiment in which the filter unit 300 is configured separately and coupled to the second tube 280.

Referring to the drawings, the filter unit 300 may include a filter body 310 and a filter member 320. The filter body 310 may have a cylindrical tube shape, and may be configured to communicate with the air flow path 201 after being coupled to the second tube 280 and to be detachably fitted into the other end of the second tube 280.

The filter member 320 is coupled to the inside of the filter body 310 to filter foreign substances. The filter member 320, as shown in the drawing, is configured in the form of a mesh net, thereby making it possible to filter saliva or the like that is discharged when a user exhales. Here, a mesh net made of general metal, plastic, or the like may be applied to the filter member 320, but other materials may be applied thereto as long as the above-described purpose is achieved.

Meanwhile, the filter unit 300 may be provided in the mouthpiece 200 in a different manner from the configuration shown in FIGS. 4 and 5. In this case, the filter unit 300 is not a separate configuration.

Figure 6:
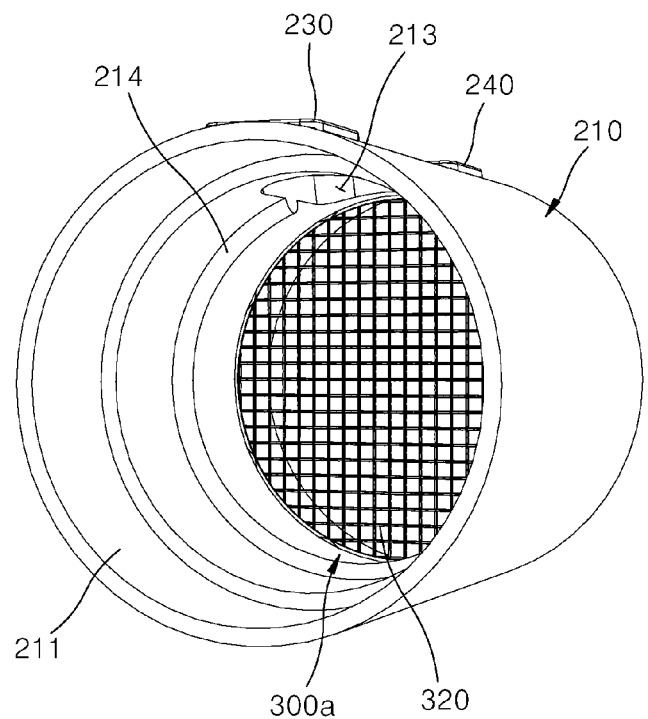
FIG. 6 is a perspective view showing another embodiment in which a filter unit is provided in a tube adapter in the mouthpiece in FIG. 4.

Referring to FIG. 6, a filter unit 300a may be provided inside the tube adapter 210.

In this case, the filter unit 300a may be located at the rear of the insertion hole 213 in the flow direction so as not to affect sensing sensitivity of the respiration measurement module 110.

The filter unit 300a may be formed in a circular shape to correspond to the inner shape of the tube adapter 210, and the outer peripheral surface thereof may be coupled to the inner peripheral surface of the tube adapter 210. Here, the filter unit 300a may be fixedly coupled to the tube adapter 210 or formed to be integrated therewith. In this manner, various embodiments may be implemented.

Meanwhile, FIG. 6 shows the case in which the filter unit 300a is provided in the tube adapter 210, but it goes without saying that the filter unit 300a may be provided in the first tube 270 and the second tube 280 as an embodiment.

Hereinafter, a description will be given as to the principle that the respiration measurement module 110 measures respiration volume of a user through the differential pressure generated by the first differential pressure generation portion 111 and the second differential pressure generation portion 214.

Figure 7:
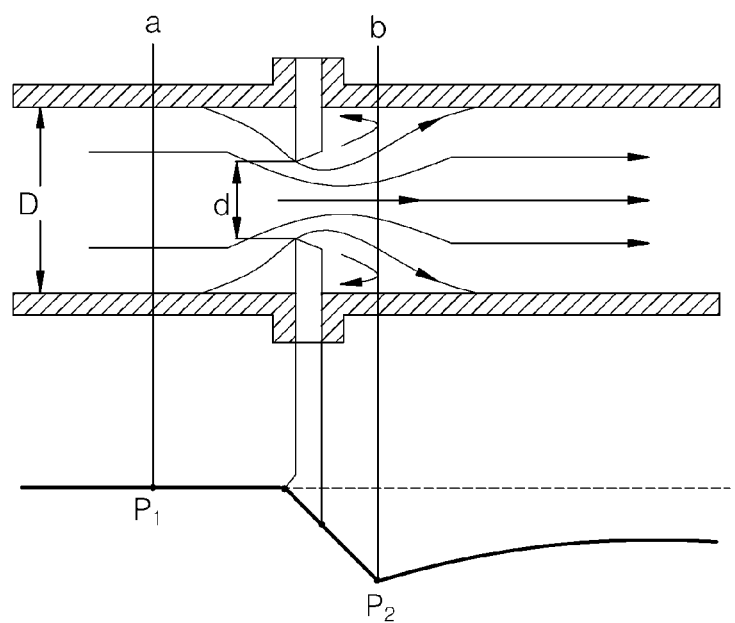
FIG. 7 is a cross-sectional view showing the principle of measuring respiration volume through a first pressure generation portion and a second pressure generation portion in the mouthpiece assembly for the respiration measurement device in FIG. 1.

First, FIG. 7 is a view showing a pressure change when an orifice tube is installed inside a general flow path. Referring to the drawing, Equation 1 and Bernoulli's Equation and Continuity Equation of Equation 2 may be established between an upstream cross section a of the orifice tube and a cross section b thereof where the flow of air becomes narrow.

$$P_1 + \frac{\rho_1 V_1^2}{2} = P_2 + \frac{\rho_2 V_2^2}{2} \qquad \text{Equation 1}$$

$$\rho_1 V_1 A_1 = \rho_2 V_2 A_2 \qquad \text{Equation 2}$$

Here, $V_1$ and $V_2$, $P_1$ and $P_2$, $\rho_1$ and $\rho_2$, $A_1$ and $A_2$ respectively represent average flow velocity, pressure, fluid density, and flow cross-sectional area in portions a and b. A relationship between flow rate Q passing through the orifice tube and differential pressure ($P_1-P_2$) is as shown in Equation 3 through Equation 1 and Equation 2.

$$Q = V_2 A_2 \qquad \text{Equation 3}$$
$$= A_2 \frac{1}{(1-(A_2/A_1)^2)^{1/2}} \left[\frac{1}{\rho_1}(P_1 - P_2)\right]^{1/2}$$

Accordingly, if $P_1$ and $P_2$ are known, the flow rate Q may be obtained. Meanwhile, Equations 1 to 3 are known flow rate calculation equations through the orifice, and a detailed description thereof will be omitted.

As described above, it may be seen that the flow rate may be measured through the differential pressure measured in the orifice tube. Accordingly, in the present invention, when the first main body 100 and the tube adapter 210 are coupled to each other, the orifice (tube) is formed in the air flow path 201 through the first differential pressure generation portion 111 and the second differential pressure generation portion 214 to generate differential pressure. Thereafter, the differential pressure is measured through the respiration measurement module 110, thereby making it possible to calculate respiration volume of a user by the above-described measurement principle.

Hereinafter, a description will be given of another embodiment in which a first coupling portion 120a, a second coupling portion 130a, third coupling portions 230a and 230b, and fourth coupling portions 240a and 240b are provided in the mouthpiece assembly for there spiration measurement device of the present invention.

Figure 8:
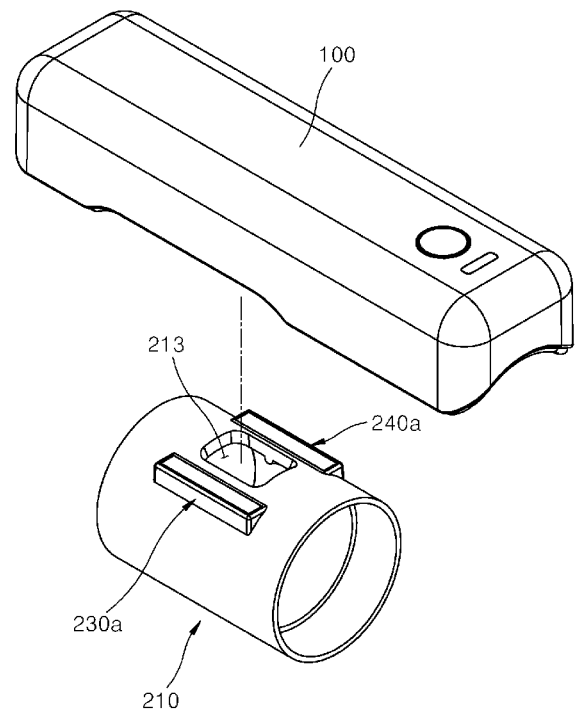
FIG. 8 is an exploded perspective view showing another embodiment of a third coupling portion and a fourth coupling portion in the mouthpiece assembly for the respiration measurement device in FIG. 1.

First, referring to FIG. 8, the third coupling portion 230a and the fourth coupling portion 240a are provided on the outer peripheral side surface of the tube adapter 210, and may be spaced apart from each other in the circumferential direction of the tube adapter 210 with the insertion hole 213 interposed there between.

Figure 9:
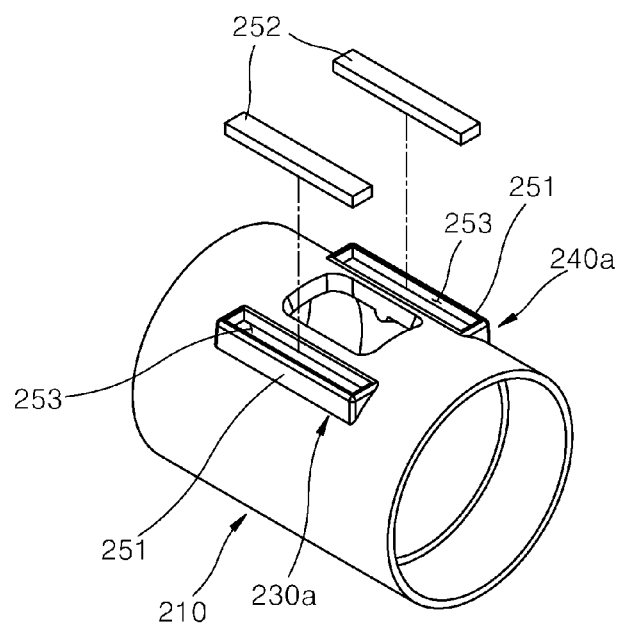
FIG. 9 is an exploded perspective view showing in detail the configuration of the third coupling portion and the fourth coupling portion in the mouthpiece assembly for the respiration measurement device in FIG. 8.

Referring to FIG. 9, each of the third coupling portion 230a and the fourth coupling portion 240a may include a protrusion portion 251 and a first magnet member 252.

The protrusion portion 251 has a rectangular shape in plan view, and the direction of the long side thereof is arranged in the axial direction of the tube adapter 210.

Here, the protrusion portion 251 is formed to protrude outwards from the outer peripheral surface of the tube adapter 210, as shown in the drawing, and may serve as a locking protrusion configured to prevent the first main body 100 from shaking when the tube adapter 210 is coupled to the first main body 100. Accordingly, more stable coupling between the tube adapter 210 and the first main body 100 may be performed.

The protrusion portion 251 may include a fitting portion 253 having the first magnet member 252 coupled thereto.

The fitting portion 253 may be formed on the upper surface of the protrusion portion 251, and may be formed in the form of a groove having a predetermined depth from the upper surface of the protrusion portion 251.

The first magnet member 252 may be fitted into the fitting portion 253, and may be formed to have a thickness corresponding to a shape and a predetermined depth of the fitting portion 253.

The first magnet member 252 has a bottom surface to which a bonding material is applied, wherein the bottom surface is in face-to-face contact with the fitting portion 253, so that the position thereof is fixed after being inserted into and coupled to the fitting portion 253, thereby being fixedly coupled to the fitting portion 253. In this manner, when the first main body 100 is detached from the tube adapter 210, it is possible to prevent a state in which the first magnet member 252 is separated from the fitting portion 253 while being coupled to a second magnet member 122.

Figure 10:
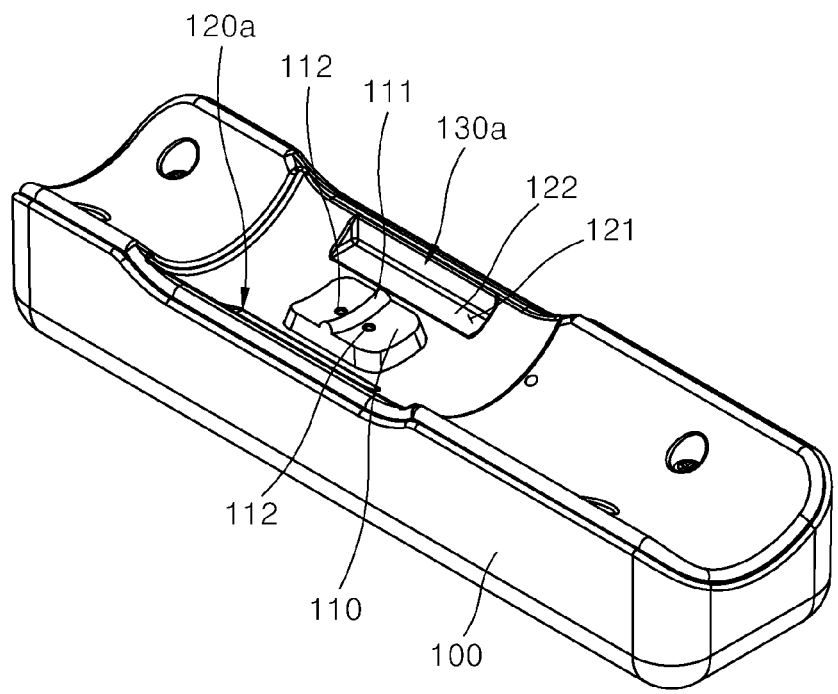
FIG. 10 is a perspective view showing a bottom surface of a first main body in the mouthpiece assembly for the respiration measurement device in FIG. 8.

FIG. 10 is a bottom view showing the first coupling portion120a and the second coupling portion130a of the first main body 100 in FIG. 8. Referring to the drawing, the first coupling portion120a and the second coupling portion130a are formed so that the third coupling portion230a and the fourth coupling portion240a may be inserted there into and seated thereon, respectively. Each of the first coupling portion120a and the second coupling portion130a may include an insertion groove portion 121 and a second magnet member 122.

First, the insertion groove portion 121 may be located at a position corresponding to each of the first coupling portion120a and the second coupling portion130a, and the protrusion portion 251 may be inserted there into.

Here, the insertion groove portion 121 is formed to correspond to the shape of the protrusion portion 251. Further, the insertion groove portion 121 may be formed so that the bottom surface of the first main body 100 is in contact with the outer peripheral surface of the tube adapter 210. Accordingly, the protrusion portion 251 may be completely inserted into the insertion groove portion 121 when the insertion groove portion 121 is coupled thereto.

The second magnet member 122 is provided in the insertion groove portion 121, and attractive force thereof is applied to the first magnet member 252 to enable the first main body 100 and the tube adapter 210 to be detached from each other.

Figure 11:
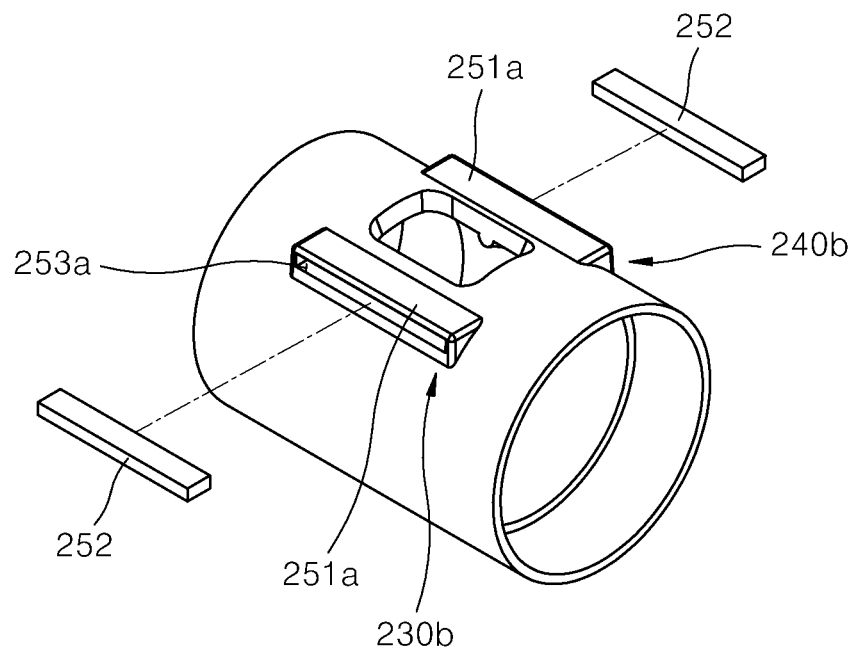
FIG. 11 is an exploded perspective view showing another embodiment of the third coupling portion and the fourth coupling portion in FIG. 9.

FIG. 11 is a view showing another embodiment of the third coupling portion230b and the fourth coupling portion240b. Referring to the drawing, each of the third coupling portion230b and the fourth coupling portion240b includes a protrusion portion251a and the first magnet member 252, and the first magnet member 252 may be inserted into and coupled to the protrusion portion251a in the lateral direction.

In this case, the protrusion portion251a may have a fitting portion253a formed on the side surface thereof, and the first magnet member 252 may be inserted into and coupled to the fitting portion253a in the lateral direction.

Meanwhile, in this case, the first magnet member 252 may be fitted into the fitting portion253a without a separate bonding material applied thereto. This is because the detachment direction of the first main body 100 and the coupling direction of the first magnet member 252 are different from each other, and the upper surface of the protrusion portion251b is shielded. Accordingly, when the first main body 100 is detached from the tube adapter 210, it is possible to prevent a state in which the first magnet member 252 is separated from the fitting portion 253a while being coupled to the second magnet member 122.

Hereinafter, another embodiment of the mouthpiece 200 will be described.

Figure 12:
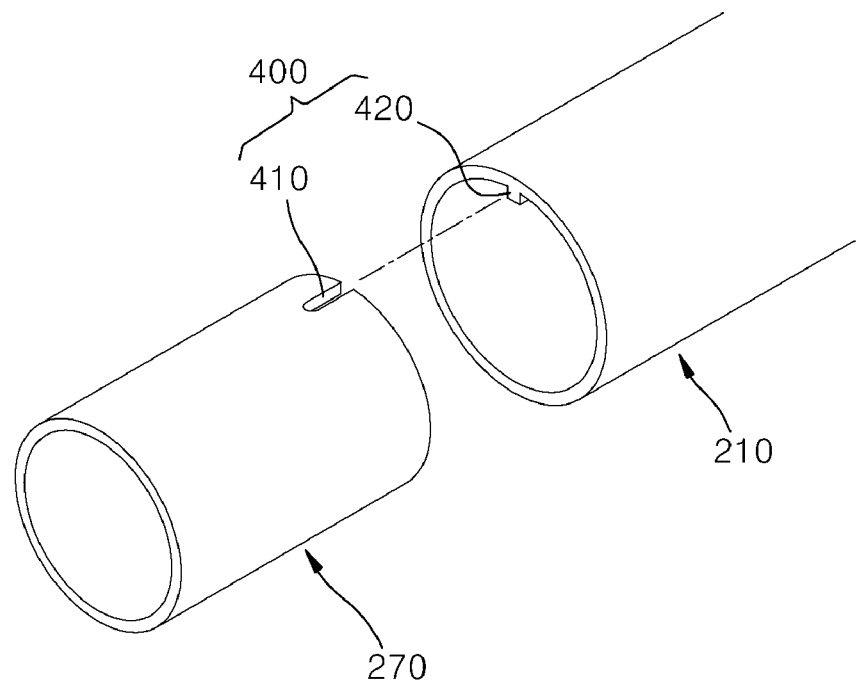
FIG. 12 is a perspective view showing a case in which a rotation prevention portion is provided in the mouthpiece assembly for the respiration measurement device in FIG. 1.

Referring to FIG. 12, the mouthpiece 200 may further include a rotation prevention portion 400 capable of preventing rotation of the first tube 270 and the second tube 280 in the state in which the first tube 270 or the second tube 280 is fitted into and coupled to the tube adapter 210.

The rotation prevention portion 400 may include a rotation prevention groove 410 and a rotation prevention protrusion 420.

The rotation prevention groove 410 may be formed to have a predetermined length in the insertion direction from one end of the first tube 270. The rotation prevention groove 410 may not only prevent rotation of the second tube 270 after the first tube 270 is coupled to the tube adapter 210, but also guide the insertion of the first tube 270 into the tube adapter 210, thereby making it possible to perform easier and more stable coupling there between. Here, the rotation prevention groove 410 may limit the insertion depth through the formed length thereof. Accordingly, it is possible to prevent the first tube 270 from being excessively inserted into the tube adapter 210.

The rotation prevention protrusion 420 is formed on the inner peripheral side surface of one end of the tube adapter 210, and is fitted into the rotation prevention groove 410 when the first tube 270 is coupled to the tube adapter 210.

The rotation prevention protrusion 420 may have various shapes such as a cylindrical shape or a square box shape, and the rotation prevention groove 410 may be formed in a shape corresponding to the shape of the rotation prevention protrusion 420 so that the outer surface of the rotation prevention protrusion 420 is in close contact with the rotation prevention groove 410 when the rotation prevention protrusion 420 is inserted into the rotation prevention groove 410 and seated therein.

Figure 13:
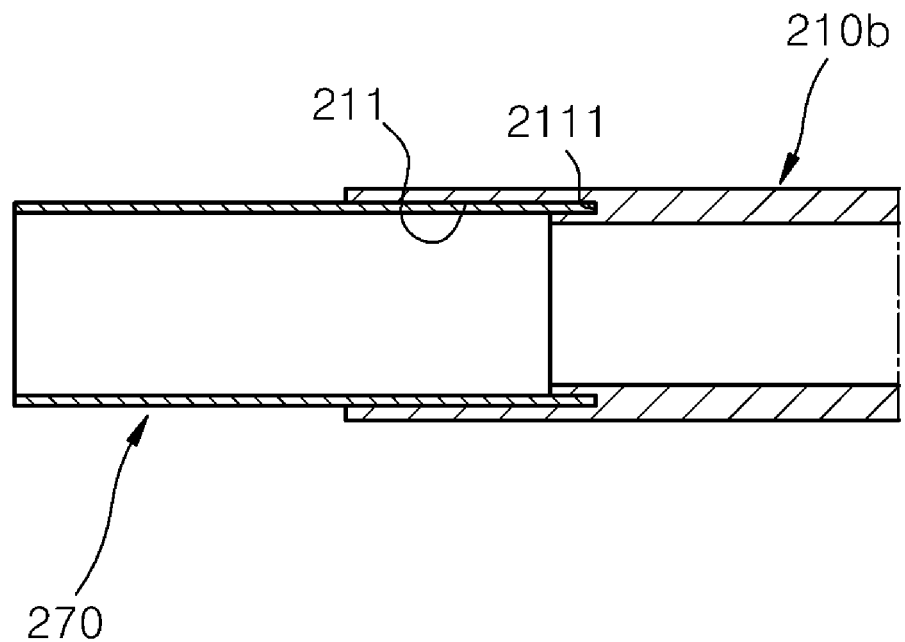
FIG. 13 is a front cross-sectional view showing a case in which an insertion groove portion is formed in the mouthpiece assembly for the respiration measurement device in FIG. 1.

FIG. 13 is a view showing another embodiment of the mouthpiece of the present invention.

Referring to the drawing, a tube adapter 210b may have a fitting groove portion 2111 formed on the first seating surface 211.

The fitting groove portion 2111 is formed at a stepped portion of the first seating surface 211, and when the first tube 270 is seated on the first seating surface 211 and contact-coupled thereto, the insertion end of the first tube 270 is fitted into the fitting groove portion 2111.

Since the first tube 270 is made of a thin paper material, the fitting groove portion 2111 prevents lifting or crumpling that may occur when the first tube 270 is inserted into the tube adapter 210b, thereby making it possible not only to reduce flow resistance due to such lifting or crumpling when a user breathes in and out, but also to prevent deterioration in sensing sensitivity. Meanwhile, it goes without saying that the fitting groove portion 2111 may be formed not only on the first seating surface 211 but also on the second seating surface 212.

Furthermore, although not shown, the mouthpiece 200 may include a respiration pressure adjustment unit provided in the first tube 270 or the second tube 280 and configured to adjust respiration pressure of a user. The respiration pressure adjustment unit adjusts the flow passage and cross-sectional area of the air flow path 201 during respiration to adjust the pressure of respiration flowing into the air flow path 201, thereby providing respiration pressure suitable for the user's health condition during aerobic exercise. Accordingly, it is possible to increase the effects of aerobic exercises of individual users.

Although the present invention has been described with reference to the embodiments shown in the drawings for illustrative purposes, those skilled in the art will appreciate that various modifications and equivalent other embodiments are possible therefrom. Therefore, the true technical protection scope of the present invention should be determined by the technical spirit of the appended claims.

INDUSTRIAL APPLICABILITY

As is apparent from the above description, the present invention may be applied to a respiration measurement device.

The invention claimed is:

1. A mouthpiece assembly for a respiration measurement device, the mouthpiece assembly comprising:
a first main body comprising a respiration measurement module; and
a mouthpiece detachably coupled to the first main body, the mouthpiece having an air flow path formed therein,
wherein:
the mouthpiece comprises:
a tube adapter having a cylindrical tube shape and the air flow path formed therein, wherein the tube adapter has a first seating surface formed on an inner peripheral surface or an outer peripheral surface of one end thereof, and an insertion hole formed to penetrate an outer peripheral side surface thereof, wherein the respiration measurement module is inserted into the insertion hole when the tube adapter is coupled to the first main body, wherein the insertion hole is shielded when the respiration measurement module is inserted into the insertion hole; and
a first tube having a cylindrical tube shape, wherein the first tube has one end thereof detachably coupled to the one end of the tube adapter, and one side surface thereof contact-coupled to the first seating surface when coupled to the tube adapter;
the respiration measurement module has a first differential pressure generation portion formed to protrude from a side surface thereof facing the air flow path, wherein the first differential pressure generation portion has a predetermined thickness and height; and
the tube adapter has a second differential pressure generation portion formed to protrude from an inner side surface thereof, wherein the second differential pressure generation portion has a predetermined thickness and height corresponding to the first differential pressure generation portion.

2. The mouthpiece assembly according to claim 1, wherein:
the tube adapter has a second seating surface formed on an inner peripheral surface or an outer peripheral surface of another end thereof; and
the mouthpiece further comprises a second tube having a cylindrical tube shape, wherein the second tube has one end thereof detachably coupled to the another end of the tube adapter, and one side surface thereof contact-coupled to the second seating surface when coupled to the tube adapter.

3. The mouthpiece assembly according to claim 2, wherein:
the first main body comprises a first coupling portion and a second coupling portion detachably coupled to the tube adapter; and
the tube adapter comprises a third coupling portion and a fourth coupling portion detachably coupled to the first coupling portion and the second coupling portion at positions respectively corresponding to the first coupling portion and the second coupling portion when coupled to the first main body.

4. The mouthpiece assembly according to claim 3, wherein:
each of the third coupling portion and the fourth coupling portion comprises:
a protrusion portion formed to protrude from an outer peripheral surface of the tube adapter, the protrusion portion having a fitting portion formed on an upper surface or a side surface thereof, and a first magnet member provided in the fitting portion; and
each of the first coupling portion and the first coupling portion comprises:
an insertion groove portion located at a position corresponding to the protrusion portion, the insertion groove portion having the protrusion portion inserted thereinto, and a second magnet member provided in the insertion groove portion.

5. The mouthpiece assembly according to claim 1, wherein the first differential pressure generation portion and the second differential pressure generation portion are configured to form an annular orifice on an inner peripheral surface of the tube adapter in a circumferential direction when the first main body is coupled to the tube adapter.

6. The mouthpiece assembly according to claim 2, wherein the mouthpiece further comprises a filter unit coupled to at least one of the tube adapter, the first tube, or the second tube to filter foreign substances according to respiration of a user.

* * * * *